United States Patent
Makino et al.

(10) Patent No.: US 6,246,198 B1
(45) Date of Patent: Jun. 12, 2001

(54) CURRENT-LIMITING VALUE SETTING METHOD FOR ELECTRIC-VEHICLE TRAVELING MOTOR, AND DEVICE FOR PRACTICING THE METHOD

(75) Inventors: Noriaki Makino; Tadashi Banba, both of Shiga (JP)

(73) Assignee: Nippon Yusoki Co., Ltd., Kyoto (JP)

( * ) Notice: Subject to any disclaimer, the term of this patent is extended or adjusted under 35 U.S.C. 154(b) by 0 days.

(21) Appl. No.: 09/406,842

(22) Filed: Sep. 28, 1999

(30) Foreign Application Priority Data

Oct. 5, 1998 (JP) ................................... 10-282319

(51) Int. Cl.[7] .................................................. H02K 17/32
(52) U.S. Cl. ......................... 318/434; 180/65.8; 360/93.9
(58) Field of Search ........................... 318/139, 432–434; 361/31–32, 86–87, 93.9; 180/170, 171, 65.1, 65.8

(56) References Cited

U.S. PATENT DOCUMENTS

| | | | |
|---|---|---|---|
| 3,855,512 | * 12/1974 | Konrad | 318/139 |
| 4,172,232 | * 10/1979 | Joyes | 318/139 |
| 4,514,665 | * 4/1985 | Meloak et al. | 318/139 |
| 4,772,829 | * 9/1988 | Pickering et al. | 318/139 |
| 5,341,077 | * 8/1994 | Chen et al. | 318/434 |
| 5,568,052 | * 10/1996 | Swaq-Tin et al. | 324/435 |
| 5,736,831 | * 4/1998 | Harrington | 320/9 |
| 5,934,398 | * 8/1999 | Hotta | 318/434 |

FOREIGN PATENT DOCUMENTS 56-68294   6/1981   (JP) .................... H02P/7/62

* cited by examiner

*Primary Examiner*—David S. Martin
(74) *Attorney, Agent, or Firm*—Sughrue, Mion, Zinn, Macpeak & Seas, PLLC

(57) ABSTRACT

In a current-limiting setting mode, with, the motor locked and with the accelerator 4 operated fully, the detection current value of the motor provided by a current sensor CT is displayed. The operator, while observing the display, operates up/down push buttons 13 and 14 until the detection current value reaches a predetermined current-limiting value, and a duty of application of current is stored. This feature makes it unnecessary to additionarily provide a current meter, and makes it possible for only one person to perform the adjusting operation.

4 Claims, 3 Drawing Sheets

CURRENT-LIMITING VALUE SETTING METHOD FOR ELECTRIC-VEHICLE TRAVELING MOTOR, AND DEVICE FOR PRACTICING THE METHOD

BACKGROUND OF THE INVENTION

1. Field of the Invention

This invention relates to a current-limiting value setting method for an electric-vehicle traveling motor, and a device for practicing the method.

2. Description of the Related Art

Heretofore, in an industrial or electric-vehicle motor, a current-limiting value setting operation is carried out; more specifically, an adjusting operation comprised of setting a predetermined upper-limit current with respect to a rated current, which flows at the time of motor lock, is carried out. The current-limiting value is a value which is suitable for the actual application of the user or the design of the motor, and therefore it is determined for every user.

An arrangement and method for setting the current limit value will be described with reference to FIG. 3. The current flowing in the motor is chopper-controlled by a control element 1 which is connected in series to the armature A of the motor. The control element 1 is controlled by a control board (substrate) 2 including, among other things a microcomputer. The control board 2 is to chopper-control the motor current with a predetermined duty-cycle according to a motor current value detected by a current sensor CT and an instruction value provided by the accelerator (not shown). This current-value setting operation of the motor current is carried out as follows: With the motor locked and with the accelerator operated fully, the effective current of the motor is measured with a current meter 3 (provided separately). And a current-limiting value adjusting resistor (a variable resistor) VR in the control board 2 is adjusted such that the motor current value is equal to a predetermined current-limiting value.

However, the above-described conventional current-limiting value adjusting method and corresponding device suffer from the following problems: It is necessary to separately provide the current meter 3, and the accelerator operation section and the control board 2 are spaced apart from each other. Hence, it is necessary to provide two operators, a person for performing the accelerator operation for the motor current, and a person for adjusting the variable resistor VR in the control board 2. That is, the method and device are low in work efficiency.

SUMMARY OF THE INVENTION

Accordingly, an object of the invention is to solve the above-described problems. More specifically, an object of the invention is to provide a current-limiting value setting method for an electric-vehicle motor in which the current-limiting adjustment is simple and can be achieved by a single person, and it is unnecessary to additionally provide a current meter, and which has a high work efficiency, and a device for practicing the method.

The foregoing object of the invention has been achieved by the provision of the following means:

(1) A first embodiment of the invention includes a current-limiting value setting method in which a control circuit of an electric vehicle motor is adjusted, to set a predetermined upper current corresponding to a rated current which flows when the motor is locked.

The method comprises placing the mode of the control circuit in a current-limiting value setting mode, and with the motor locked, displaying a detection current value of the motor on a display means.

Further, an adjustment means is operated up and/or down and with an accelerator adapted to issue a traveling instruction operated fully, the adjusted means increases or decreases a duty-cycle of the application of the current to the motor so that the detection current value displayed on the display means is a predetermined current-limiting value.

Also, in accordance with this embodiment, when the detection current value reaches the predetermined current limiting value, the duty-cycle of the current at that time is stored in memory means, and the mode of the control circuit is switched back to an effective current display mode.

In accordance with the method, in the current-limiting value setting mode, the motor is locked, and with the accelerator operated fully the detection current value of the motor, which has been originally provided for controlling the motor traveling operation is displayed on the display means, and the operator, while observing the display, operates the up/down adjusting means so that the detection current value displayed on the display is the predetermined current value. When the detection current value reaches the predetermined current-limiting value, the duty-cycle of the current is stored in the memory means, and the mode is switched back to the effective current display mode. And, when necessary, with the motor maintained in a locked state, it is confirmed that the effective current value is the preset current-limiting value. Hence, it is unnecessary to additionally provide the current meter, and it is possible for a single person to achieve the adjusting operation.

(2) A second embodiment of the invention includes a current-limiting value setting device in which a control circuit of an electric vehicle motor is adjusted, to set a predetermined upper current corresponding to a rated current which flows when the motor is locked.

A device in accordance with the second embodiment of the invention comprises a mode switching means for switching a mode of the control circuit over to a current-limiting value setting mode;

displaying means for displaying a detection current value of the motor with the motor locked;

an accelerator which is provided at a driver's seat, and issues a traveling instruction;

up/down adjusting means which is provided near the driver's seat, and increases or decreases a duty of application of current to the motor; and memory means for storing a duty-cycle of the current when the detection current value reaches a predetermined current limiting value, and in which when a mode of the control circuit is set to a current-limiting value setting mode, with the accelerator operated fully the up/down adjusting means is operated so that a detection current value displayed on the display means is a predetermined current-limiting value, and the duty-cycle of the current at that time is stored in the memory means.

The second embodiment has similar results as the first embodiment.

DETAILED DESCRIPTION OF THE PREFERRED EMBODIMENTS

A preferred embodiment of the invention will be described with reference to the accompanying drawings.

Figure 1:
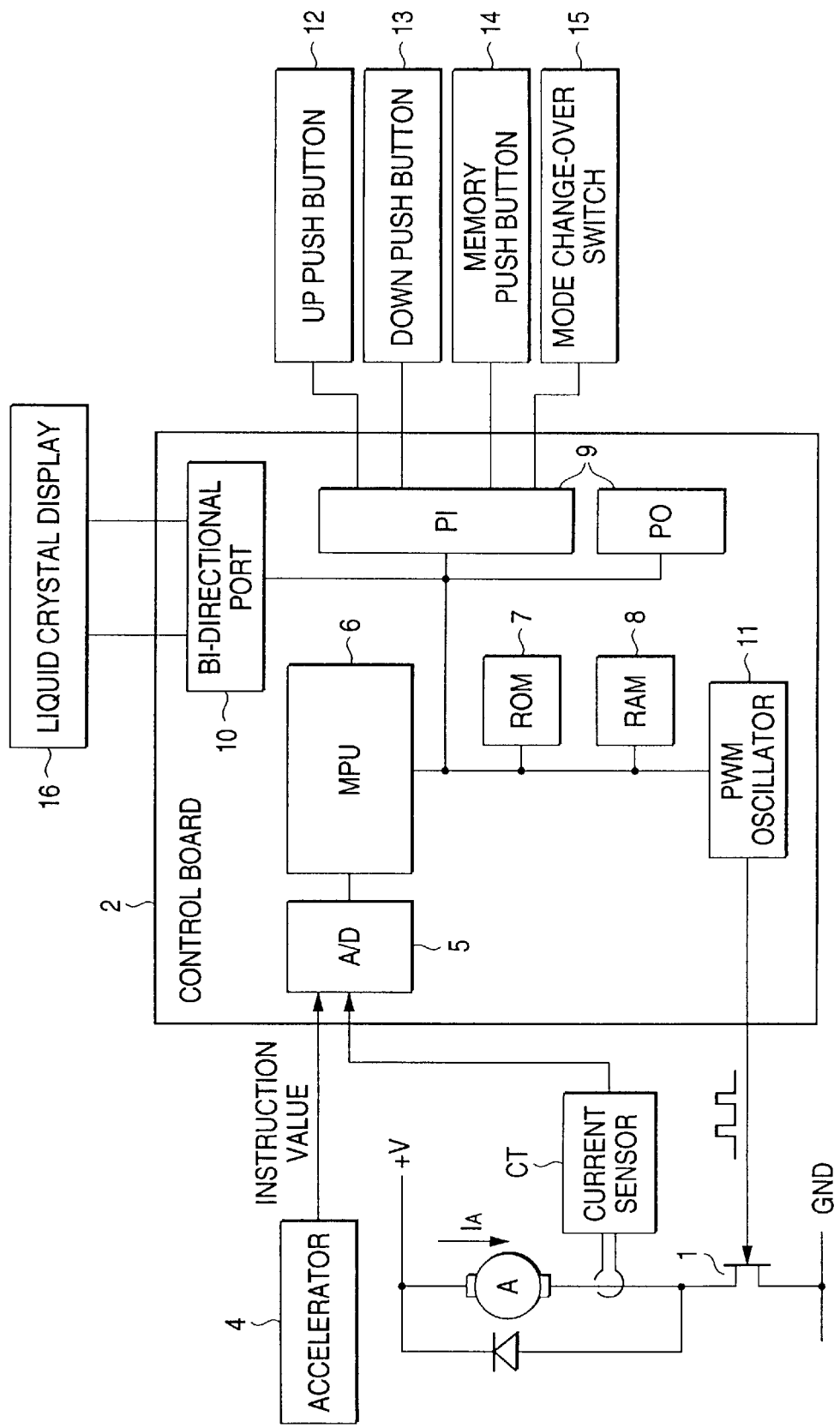
FIG. 1 is a control circuit diagram of an electric vehicle traveling motor to which a current-limiting value setting method, which is an embodiment of the invention.

FIG. 1 shows an electric-vehicle traveling motor control circuit to which a current-limiting value setting method is applied. A motor control circuit comprises: a semiconductor control element 1 which is connected in series to the armature A of an electric motor, and is adapted to chopper-control motor current; and a control board (substrate) including a micro-computer adapted to control the control element 1, and etc. The control board 2 is provided to chopper-control the motor current with a predetermined duty according to a motor current value detected with a current sensor CT for a motor traveling operation (which may be a Hall element which magnetically performs the detection), and to an instruction value provided by an accelerator 4. The control board 2 comprises an A/D conversion input section 5, an MPU 6 in charge of control operations, a ROM in which programs are stored, RAM 8 (memory means) for storing data, interface (PI, and PO) sections 9 for a variety of peripheral devices, a bi-directional port 10, and a PWM oscillator 11 for subjecting motor current to pulse width modulation.

The interface (PI) section 9 is connected to an up (UP) push button 12 and a down (DOWN) push button 13 (up/down adjusting means), a memory push button 14 for storing set data in the RAM 8, and a mode change-over switch 15 comprising, for example a rotary switch for switching the operation mode of the MPU 6. The bi-directional port 10 is connected to a liquid crystal display 16 (display means) for displaying a variety of data. It is preferable that the accelerator 4 is provided at the driver's seat, and that the up push button 12, the down push button 13 and the memory push button 14 are so arranged that the driver can operate those push buttons while operating the accelerator 4, and that the liquid crystal display 16 is provided near the driver's seat. According to this embodiment, the motor is a shunt DC motor in which field windings are wound in series on the armature windings.

In the motor control circuit designed as described above, the control board 2 operates as follows: The control board 2 operates the PWM oscillator 11 according to the motor current value detected by the current sensor CT and according to the A/D input of the instruction value provided by the accelerator 4, and the output of the latter is utilized to control the conductivity of the control element 1, thereby chopper-controlling the motor current with a predetermined duty-cycle.

Figure 2:
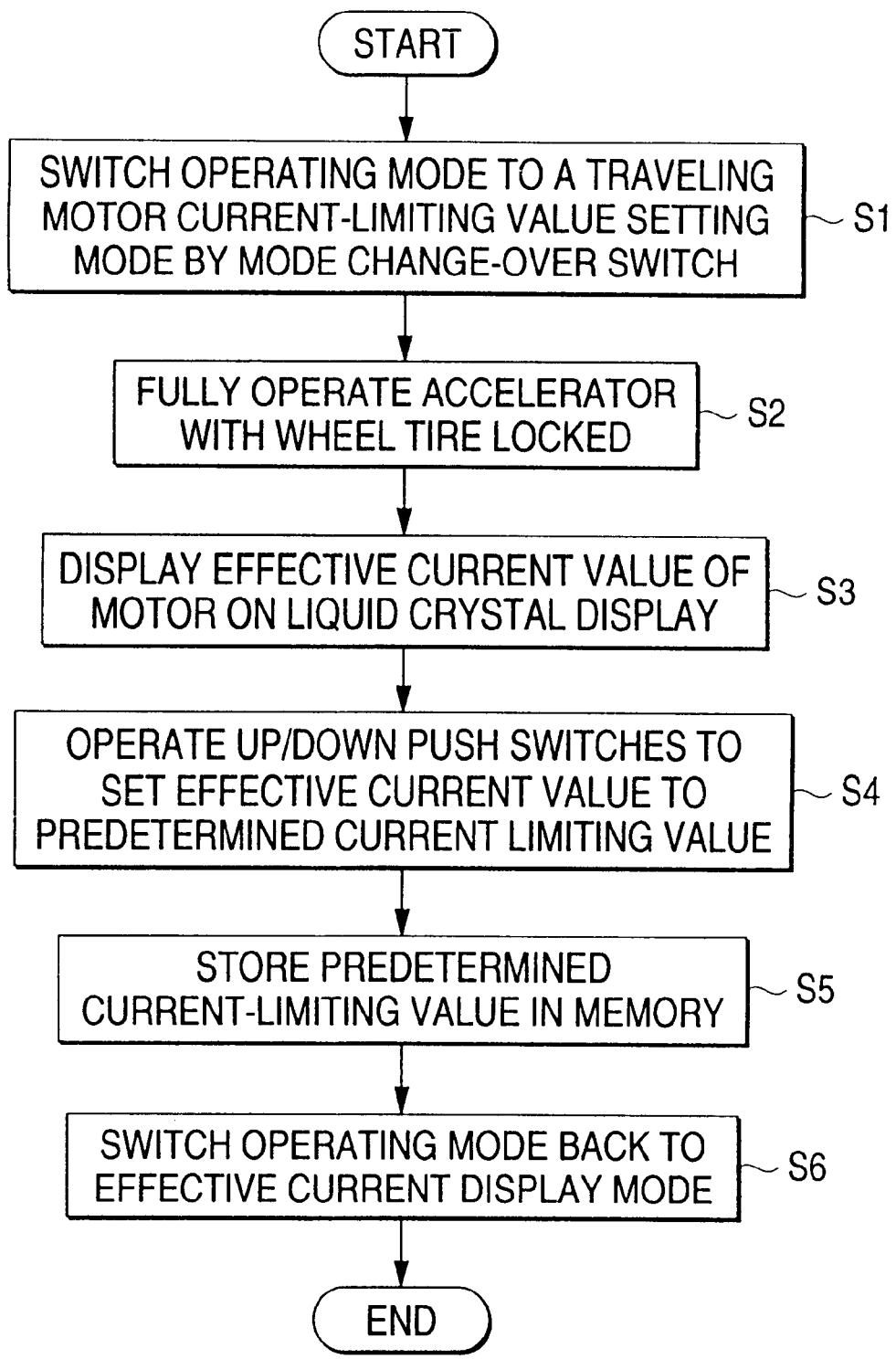
FIG. 2 is a flow chart for a description of the steps of current-limiting setting operation.
Figure 3:
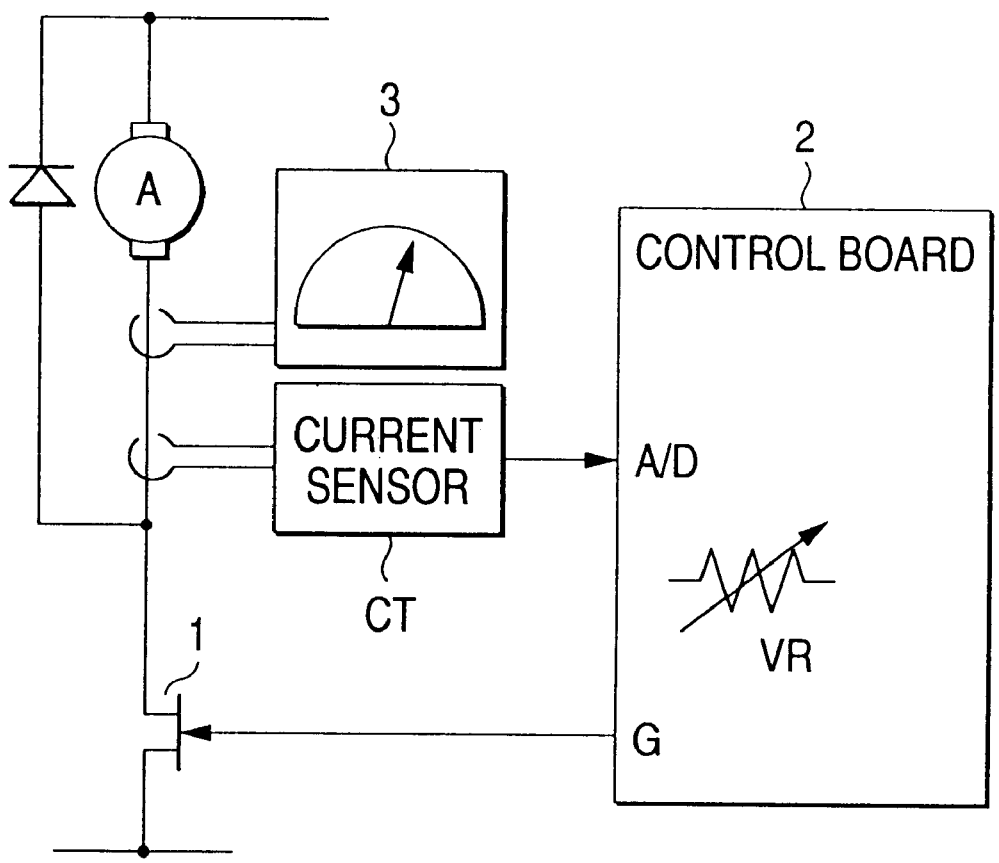
FIG. 3 is a diagram for a description of the arrangement and method of a conventional current-limiting value setting operation.

Now, the current-limiting setting operation of the motor current; in other words, the steps of setting a predetermined upper current (for instance 300% of the rated current) with respect to the rated current which flows at the time of motor lock, will be described with reference to FIG. 2.

At the time of setting the current-limiting value, the mode change-over switch 15 is operated, so that the operating mode of the MPU 6 is switched over to a traveling motor current-limiting value setting mode (Step S1), and with the wheel tire locked; i.e., with the motor locked, the accelerator 4 is operated fully (Step S2). At the same time, the effective current value of the motor (the armature A) is displayed on the liquid crystal display 16 (Step S3) Then, the operator operates the up push button 12 and/or the down push button 13 so that the detection current value displayed on the liquid crystal display 16 is set to a predetermined current-limiting value (Step S4). When the detection current value reaches the predetermined current-limiting value, the memory push button 14 is operated (depressed) to cause the RAM 8 to store the electrical continuity duty-cycle at that time (Step S5). Thereafter, the operating mode is switched back to the effective current display mode (Step S6), and, similarly as in the above-described case, with the motor locked, the motor's effective current is displayed on the liquid crystal display 16, and it is confirmed that the current thus displayed is the set current-limiting value.

In the above-described method or device, in the current-limiting value setting operation, the motor's effective current value detected by the current sensor CT, which has been originally provided for a motor traveling control, is displayed on the liquid crystal display 16 by the operation in the current-limiting value setting mode of the control board 2. Therefore, it is unnecessary to additionally provide the current meter. Furthermore, while one person operating the accelerator 4 is confirming the display on the liquid crystal display 16, he can operate the up push button 12, the down push button 13, and the memory push button 14. Hence, the current-limiting value setting operation can be achieved with ease. The mode change-over switch 15 is able to switch not only the above-described modes but also a fundamental data change mode, and a self-diagnosis mode, and makes it possible to switch data set values in detail. The contents and detection values corresponding to the modes are displayed on the liquid crystal display 16.

While the invention has been described in connection with the preferred embodiment of the invention, it will be obvious to those skilled in the art that various changes and modifications may be made therein without departing from the invention. For instance, the up push button 12 and the down push button 13 may be replaced with a rotary switch or other switches, and the liquid crystal display 16 may be replaced with an LED and other display means.

As was described above, in accordance with the invention, particularly in the current-limiting value setting mode, the motor is locked, and with the accelerator operated fully the detection current value of the motor, which has been provided for controlling of motor traveling operation, is displayed on the display means, and the operator, while observing the display, adjusts the duty of application of current to the motor. When the detection current value reaches the predetermined current-limiting value, the duty of application of current is stored in the memory means. Hence, in the invention, unlike the prior art, it is unnecessary to additionally provide the current meter, and the adjusting operation can be achieved with ease, and it is possible for a single person to achieve the adjusting operation.

What is claimed is:

1. A method of setting a current-limiting value by adjusting parameters of control circuit of an electric vehicle motor, to set a predetermined upper current corresponding to a rated current which flows when said motor is locked, said method comprising the steps of:

placing a mode of said control circuit to a current-limiting value setting mode;

displaying, on a display means, a detected current value of said motor while said motor is in locked condition;

operating an up/down adjusting means which, with an accelerator operated fully, increases or decreases a duty-cycle of a current applied to said motor so that said detected current value displayed on said means represents a predetermined current-limiting value; and storing said duty-cycle of said current in a memory means, wherein said mode of said control circuit is placed in an effective current display mode when said detected current value is approximately equal to said predetermined current-limiting value.

2. A current-limiting value setting device in which a control circuit of an electric vehicle motor is adjusted, to set a predetermined upper current corresponding to a rated current which flows when said motor is locked, said device comprising:

mode switching means for switching a mode of said control circuit to a current-limiting value setting mode;

displaying means for displaying a detected current value of said motor while said motor is locked;

an accelerator provided near a driver's seat, said accelerator operable to issue a traveling instruction;

up/down adjusting means provided near said driver's seat, said adjusting means operable to increase or decrease a duty-cycle of a current applied to said motor; and memory means for storing said duty-cycle of said current when said detected current value is approximately equal to a predetermined current limiting value;

wherein when said mode of said control circuit is set to a current-limiting value setting mode, with said accelerator operated fully said up/down adjusting means is operated so that a detection current value displayed on said display means represents a predetermined current-limiting value, and the duty-cycle of said current is stored in said memory means.

3. A method of setting a current-limiting value in a control circuit of an electric vehicle motor, said method comprising:

placing a mode of the control circuit in a current-limiting value setting mode;

displaying, on a display device, a detected current value of said motor, said detected current value being detected while said motor is in a locked condition;

operating an adjuster, operable to increase or decrease a duty-cycle of a current applied to the motor, while an accelerator is operated fully, wherein said operating is performed until the detected current value displayed on the display device represents a predetermined current-limiting value;

storing, in a memory device, a representation of the duty-cycle of the current applied to the motor, wherein the storing is performed when the displayed detected current value represents the predetermined current-limiting value; and changing the mode of the control circuit to an effective current display mode when said detected current value is approximately equal to said predetermined current limiting value.

4. A device for adjusting a parameter of a control circuit of an electric vehicle motor, said device comprising:

a mode switch operable to set a mode of said control circuit, wherein said mode includes a current-limiting value setting mode;

a display device operable to display a detected current value of said motor, wherein the detected current value is detected while said motor is in a locked condition;

an accelerator provided near an operator of the motor, said accelerator operable to issue a traveling instruction to the motor;

an up/down adjusting device provided near the driver, said adjusting device being operable to increase or decrease a duty-cycle of a current applied to the motor; and a memory device operable to store a representation of the duty-cycle of the current when said detected current value is approximately equal to a predetermined current limiting value, wherein when the mode of said control circuit is set to the current-limiting value setting mode, with said accelerator operated fully, the up/down adjusting device is operated so that a detection current value displayed on the display device represents a predetermined current-limiting value, and the duty-cycle of the current at that time is stored in the memory device.

* * * * *